United States Patent
Horiguchi

(10) Patent No.: US 6,814,689 B2
(45) Date of Patent: Nov. 9, 2004

(54) HYDRAULIC CONTROL APPARATUS OF AUTOMATIC TRANSMISSION AND METHOD THEREOF

(75) Inventor: Masanobu Horiguchi, Atsugi (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 29 days.

(21) Appl. No.: 10/292,490

(22) Filed: Nov. 13, 2002

(65) Prior Publication Data

US 2003/0104893 A1 Jun. 5, 2003

(30) Foreign Application Priority Data

Nov. 30, 2001 (JP) ........................................ 2001-365484

(51) Int. Cl.[7] .............................................. B60K 41/02
(52) U.S. Cl. ....................... 477/161; 477/157; 477/158
(58) Field of Search ............................... 477/156, 157, 477/158, 159, 160, 161

(56) References Cited

U.S. PATENT DOCUMENTS

| 5,042,323 A | * | 8/1991 | Murano et al. | ......... 477/161 X |
| 5,115,695 A | * | 5/1992 | Wakahara et al. | .......... 477/161 |
| 5,873,803 A | * | 2/1999 | Geon | ........................ 477/158 |
| 6,122,582 A | * | 9/2000 | Ueda | ..................... 477/156 X |

FOREIGN PATENT DOCUMENTS

| JP | 362053244 | * | 3/1987 | .................. 477/45 |
| JP | 10-169764 | | 6/1998 | |

* cited by examiner

Primary Examiner—Ha Ho
(74) Attorney, Agent, or Firm—Foley & Lardner LLP

(57) ABSTRACT

In a constitution where a hydraulic pressure is delivered periodically to friction engagement elements in released states to discharge air mixed into a hydraulic circuit a duty ratio in the hydraulic pressure delivery is switched to a plurality of different values according to operating conditions, a ratio of an actual total time to a target total time is switched per each of duty ratios; and the air discharge control is terminated when a sum of the ratios becomes a predetermined value or above.

20 Claims, 5 Drawing Sheets

FIG.3

|   | L/C | L & R/B | 2 & 4/B | H/C | R/C | L/OWC |
|---|-----|---------|---------|-----|-----|-------|
| 1 | ○ | ● |   |   |   | △ |
| 2 | ○ |   | ○ |   |   |   |
| 3 | ○ |   |   | ○ |   |   |
| 4 |   |   | ○ | ○ |   |   |
| R |   | ○ |   |   | ○ |   |

○ ENGAGE

● ENGAGE AT RANGE ONE

△ ENGAGE AT DRIVE

FIG.4

| GEAR POSITION \ SOLENOID | SHIFT SOLENOID (A) | SHIFT SOLENOID (B) |
|---|---|---|
| FIRST GEAR | ON | ON |
| SECOND GEAR | OFF | ON |
| THIRD GEAR | OFF | OFF |
| FOURTH GEAR | ON | OFF |

HYDRAULIC CONTROL APPARATUS OF AUTOMATIC TRANSMISSION AND METHOD THEREOF

FIELD OF THE INVENTION

The present invention relates to a hydraulic control apparatus of an automatic transmission and a method thereof, in particularly, to a hydraulic control for discharging air mixed into a hydraulic circuit.

RELATED ART OF THE INVENTION

Heretofore, there has been known an automatic transmission having a constitution in which engagement and release of friction engagement elements for gear change is controlled by a hydraulic pressure.

Further, there has been known a hydraulic control for periodically supplying a hydraulic pressure to friction engagement elements for gear change in released condition to discharge air mixed into a hydraulic circuit (refer to Japanese Unexamined Patent Publication No. 10-169764).

If, during the delivery of hydraulic pressure for air discharge, a gear change request is generated and a control is started to engage the friction engagement elements to which the hydraulic pressure has been periodically delivered for air discharge, the engagement control is started with an initial pressure higher than a normal initial pressure. Consequently, engagement timing is hastened, which may cause a gear change shock.

Therefore, it is desirable to terminate the air discharge control without delay when the air discharge is completed, so as to avoid as much as possible the generation of a gear change request during the air discharge control.

However, according to the conventional control, the hydraulic pressure is always delivered if a condition capable of supplying the hydraulic pressure is fulfilled, without determining whether or not the air discharge is completed, so it is highly possible that the gear change is started during the delivery of hydraulic pressure for air discharge.

Moreover, as in the convention technique, when a duty ratio in periodic hydraulic pressure delivery is changed according to operating conditions, it is difficult to judge precisely the completion of the air discharge based on the total delivery time.

SUMMARY OF THE INVENTION

Therefore, the present invention has an object to provide a hydraulic control apparatus and a hydraulic control method of an automatic transmission, capable of optimally controlling delivery of hydraulic pressure for air discharge, and also capable of judging completion of air discharge accurately.

In order to achieve the above object, the present invention is constituted so that a hydraulic pressure is periodically delivered to friction engagement elements in released states out of a plurality of friction engagement elements for gear change, to discharge air mixed into a hydraulic circuit, a duty ratio in the periodic delivery of hydraulic pressure is switched to a plurality of different values according to operating conditions, an achievement ratio of air discharge is calculated per each of the plurality of duty ratios, and when a sum of the achievement ratios reaches a predetermined value or above, the periodic delivery of hydraulic pressure for air discharge is terminated.

The other objects and features of this invention will become understood from the following description with reference to the accompanying drawings.

BRIEF DESCRIPTION OF THE DRAWINGS

FIG. 3 is a diagram showing a combination of friction engagement elements in each gear position;

FIG. 4 is a diagram showing an ON/OFF combination of shift solenoids A and B in each gear;

DETAILED DESCRIPTION OF PREFERRED EMBODIMENTS

Figure 1:
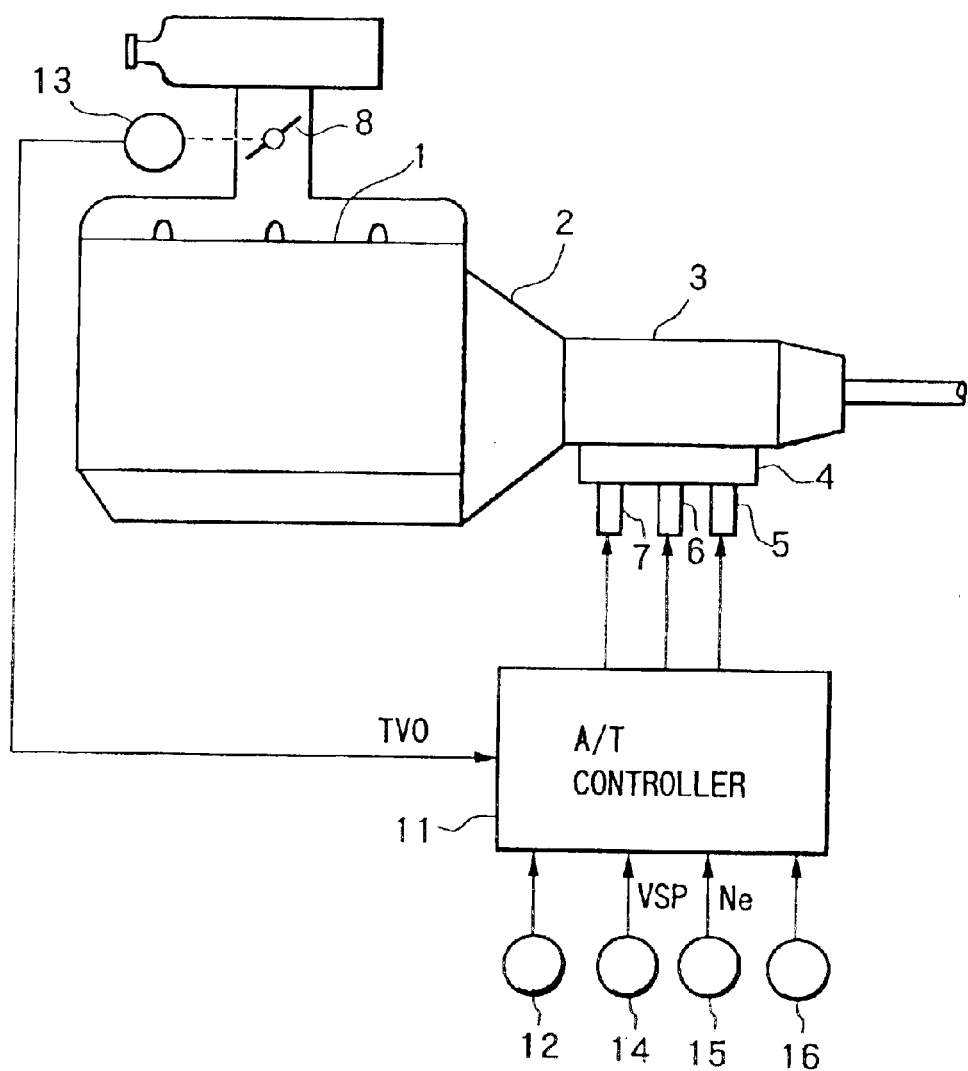
FIG. 1 is a diagram showing a system configuration of a vehicle drive train.

FIG. 1 shows a vehicle drive train.

In FIG. 1, an automatic transmission 3 is connected to an output shaft of an engine 1 via a torque converter 2.

Figure 2:
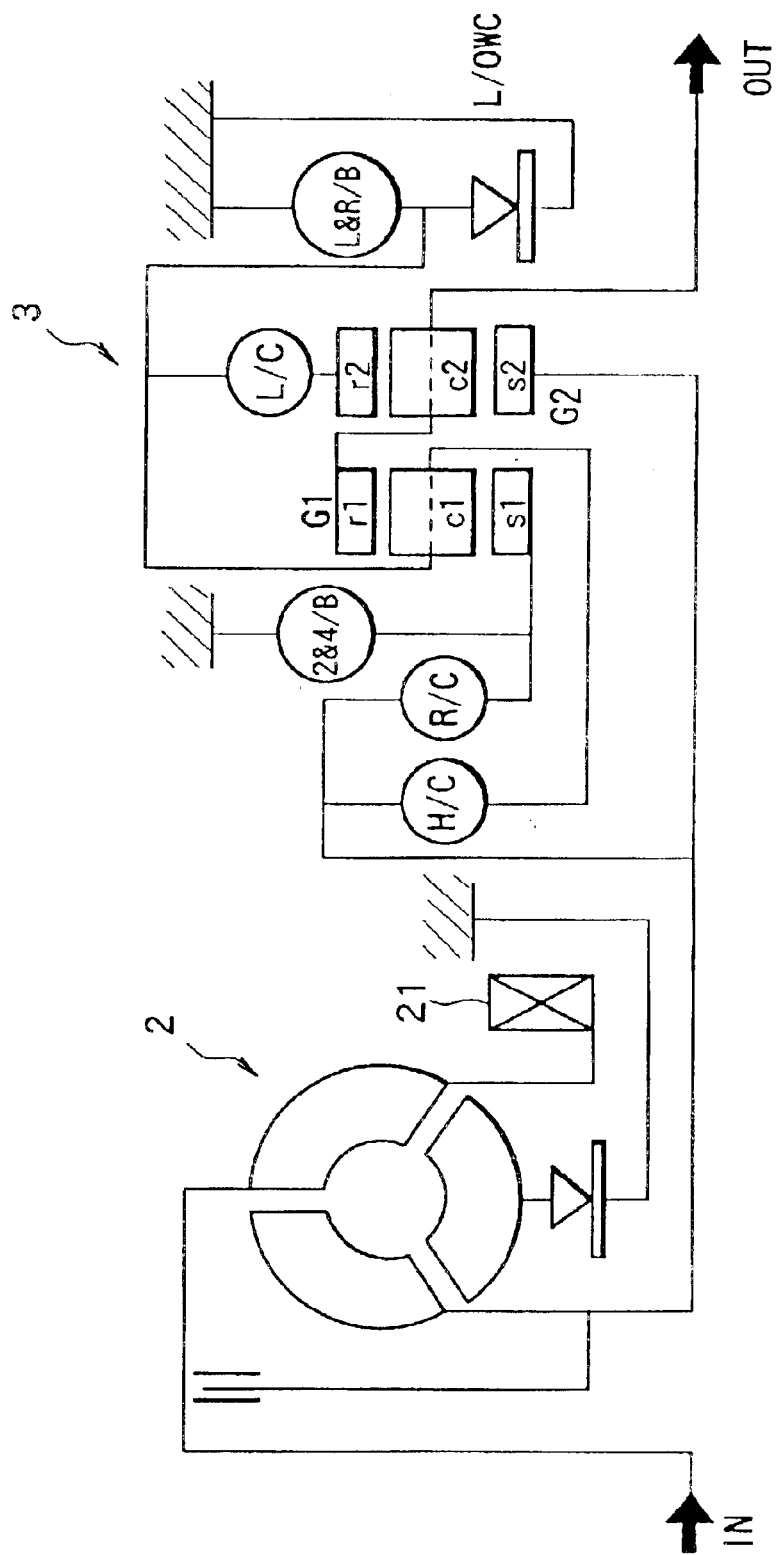
FIG. 2 is a skeleton diagram showing a transmission mechanism.

FIG. 2 is a skeleton showing a transmission mechanism of automatic transmission 3.

The transmission mechanism includes planetary gears G1, G2, multiple disc clutches (High Clutch H/C, Reverse Clutch R/C, Low Clutch L/C), a brake band 2 & 4/B, a multi plate brake (low and reverse brake L & R/B), and a one-way clutch L/OWC.

The two sets of planetary gears G1, G2 are simple planetary gears comprising sun gears S1, S2, ring gears r1, r2, and carriers c1, c2, respectively.

Sun gear S1 of planetary gear set G1 is constructed to be connectable to an input shaft IN by reverse clutch R/C and at the same time, to be fixable by brake band 2 & 4/B.

Sun gear S2 of planetary gear set G2 is connected to input shaft IN directly.

Carrier c1 of planetary gear set G1 is constructed to be connectable to input shaft IN by high clutch H/C, while ring gear r2 of planetary gear set G2 is constructed to be connectable to carrier c1 of planetary gear set G1 by low clutch L/C. Further, carrier c1 of planetary gear set G1 is constructed to be fixable by low and reverse brake L & R/B.

Ring gear r1 of planetary gear set G1 and carrier c2 of planetary gear set G2 are integrally connected to an output shaft OUT.

In FIG. 2, numeral 21 shows an oil pump that is driven by an engine 1 to send an operating fluid to the automatic transmission.

In the transmission mechanism of the above construction, forward first gear to fourth gear and reverse R are realized by a combination of engagement/release states of each clutch and brake as shown in FIG. 3.

In FIG. 3, a circle mark shows an engagement state and a portion with no mark shows a release state.

The engagement state of low & reverse brake L & R/B at first gear shown in a black circle shows the engagement state only in one range.

Each of friction engagement elements for gear change is engaged when a hydraulic pressure is delivered thereto and released when the hydraulic pressure is drained therefrom.

The engagement/release logic of the friction engagement elements is realized by an ON/OFF combination of a shift solenoid (A) 5 and a shift solenoid (B) 6 mounted to a control valve 4 for gear change control shown in FIG. 1 (refer to FIG. 4).

Further, a line pressure solenoid 7 is mounted to control valve 4, and a line pressure of control valve is controlled by line pressure solenoid 7.

Shift solenoid (A) 5, shift solenoid (B) 6 and line pressure solenoid 7 are controlled by an A/T controller 11.

A/T controller 11 is input with detection signals output from an ATF temperature sensor 12 detecting a temperature of automatic transmission fluid, a throttle opening sensor 13 detecting an opening TVO of a throttle valve 8 that is interlocked with an accelerator pedal (not shown) to throttle the intake of engine 1, a vehicle speed sensor 14 detecting a vehicle running speed VSP, an engine rotation sensor 15 detecting a rotation speed Ne of engine 1, an inhibitor switch 16 detecting a range position selected by an operation of a shift knob.

Figure 5:
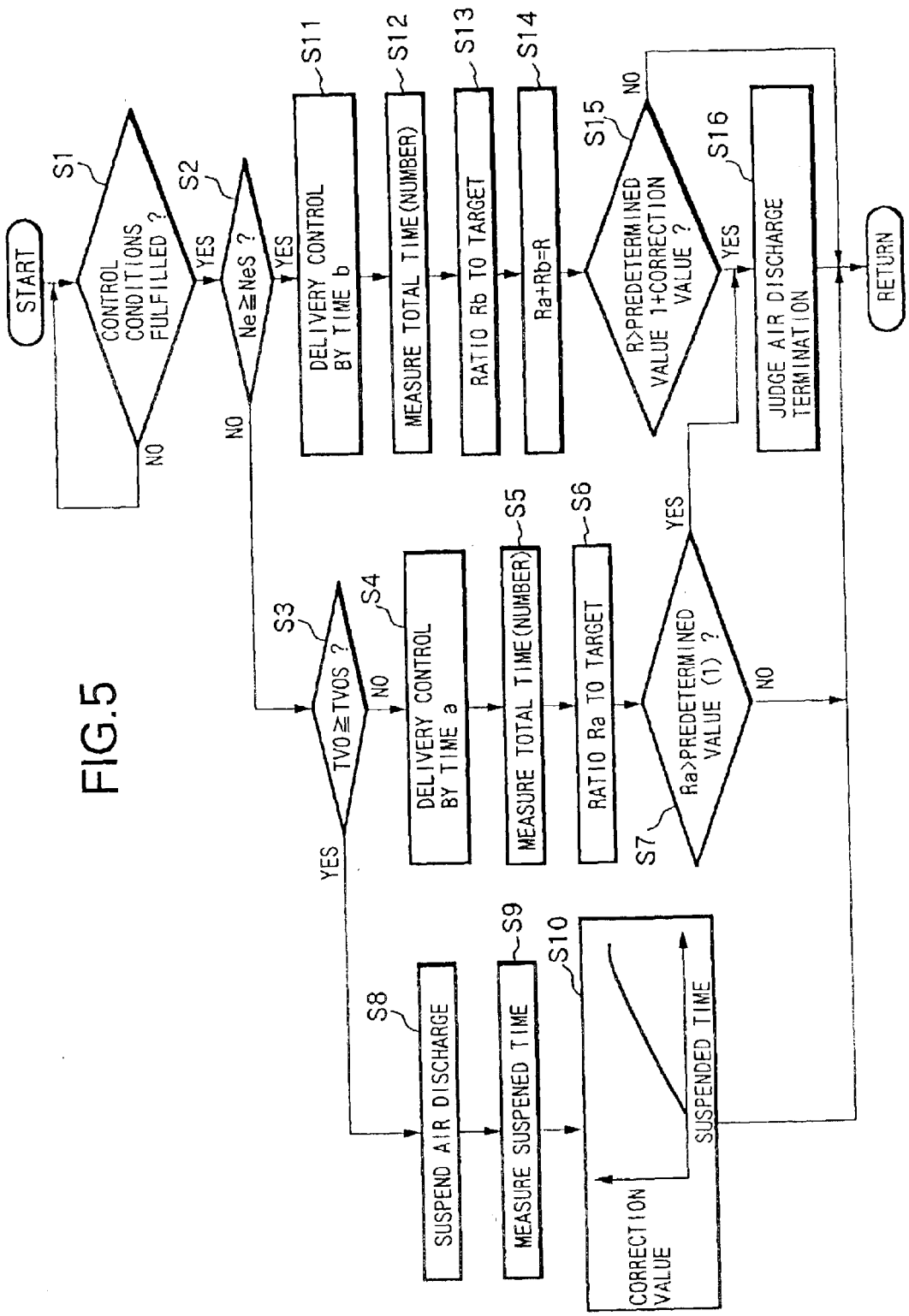
FIG. 5 is a flowchart showing the detail of air discharge control.

A/T controller 11 performs a normal gear change control based on the above-mentioned various detection signals, and on the other hand, executes a control program shown in a flowchart of FIG. 5 to perform a control to discharge air mixed into a hydraulic circuit.

The following is an explanation on the detail of the air discharge control as mentioned above with reference to the flowchart of FIG. 5.

In step S1, it is judged whether or not an execution permission condition of air discharge control is fulfilled.

Figure 6:
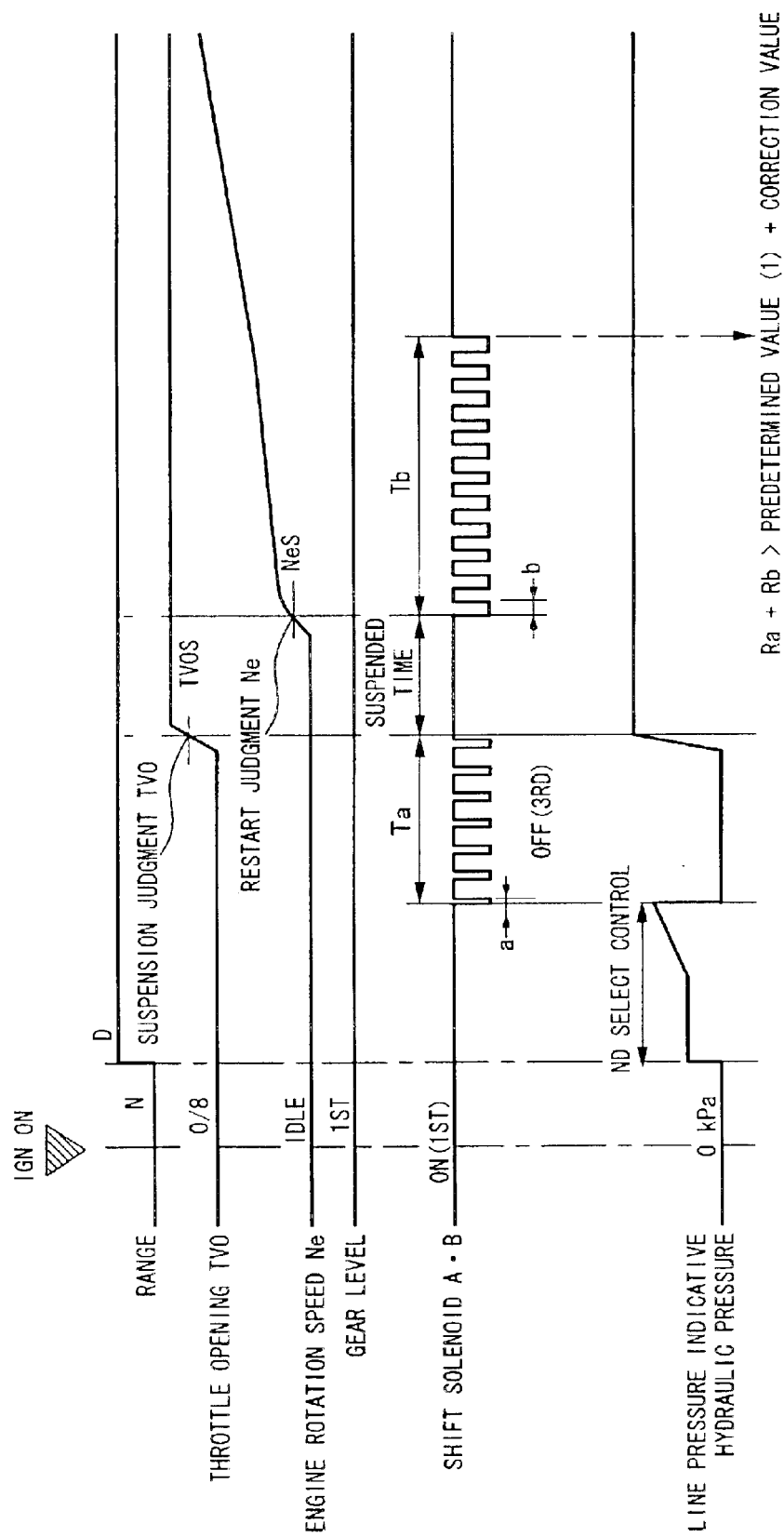
FIG. 6 is a time chart showing a characteristic of air discharge control.

For example, following conditions (1) through (4) are judged as the execution permission condition (refer to FIG. 6).

(1) A gear position is at a D range (drive range) switched from an N range (neutral range) for the first time after an ignition switch has been turned ON.

(2) A line pressure control (ND select control) performed at a predetermined time immediately after switching from the N range to the D range is terminated.

(3) The gear position is at first gear where there is no gear change request.

(4) The termination of air discharge control is not determined.

When all the above conditions (1) through (4) are fulfilled, control proceeds to step S2.

In step S2, it is judged whether or not the engine rotation speed Ne correlated with a discharge amount of an oil pump 21 is equal to or above a predetermined speed NeS.

If the engine rotation speed Ne is less than the predetermined speed NeS and the discharge amount of oil pump 21 is less than a predetermined amount, control proceeds to step S3, where it is judged whether or not the throttle opening TVO is equal to or greater than a predetermined opening TVOS, in other words, whether or not an input shaft torque of the automatic transmission is equal to or greater than a predetermined value.

If the throttle opening TVO is smaller than the predetermined opening TVOS, that is, if the engine rotation speed Ne is less than the predetermined speed Ne and the throttle opening TVO is smaller than the predetermined opening TVOS, control proceeds to step S4 where the air discharge control is executed.

Specifically, shift solenoid (A) 5 and shift solenoid (B) 6 are turned OFF together for a predetermined minute (very short) time 'a' for each predetermined control cycle (refer to FIG. 6).

At first gear, shift solenoid (A) 5 and shift solenoid (B) 6 are both controlled to ON states, and the hydraulic pressure of the high clutch H/C is drained so that the high clutch H/C is released, while the hydraulic pressure is delivered to the low clutch L/C so that the low clutch L/C is engaged.

On the contrary, a condition in which shift solenoid (A) 5 and shift solenoid (B) 6 are both OFF corresponds to third gear, and in third gear, both the low clutch L/C and the high clutch H/C are delivered with the hydraulic pressure, to be engaged (refer to FIGS. 3 and 4).

Therefore, by switching shift solenoid (A) 5 and shift solenoid (B) 6 to OFF periodically for the minute time 'a', the hydraulic pressure is delivered periodically to the high clutch H/C which should be released at first gear, and by this delivery of hydraulic pressure, the air mixed into the hydraulic circuit of the high clutch H/C is discharged.

When control proceeds to step S4, the throttle opening correlated with the input shaft torque of the automatic transmission is small and an engagement pressure required to engage the friction engagement elements to be engaged is relatively low. However, since the engine rotation speed Ne is low and the discharge amount of oil pump 21 is small, it is impossible to deliver a large amount of hydraulic pressure for air discharge.

Therefore, the period of time for turning shift solenoid (A) 5 and shift solenoid (B) 6 OFF periodically is set to the time 'a' shorter than a time 'b' in the case where the engine rotation speed Ne is high (to be described later), so as to suppress the hydraulic pressure delivered for air discharge to be relatively small.

In other words, a duty ratio of hydraulic pressure delivery is switched in accordance with the engine rotation speed as an operating condition.

In step S5, a total time Ta (or the number of times of hydraulic pressure delivery Ca) of the air discharge control in step S4 is measured.

The total time Ta of the air discharge control is a time during which periodic hydraulic pressure delivery control is executed in step S4, and the number of times of hydraulic pressure delivery Ca is measured by counting the temporary hydraulic pressure delivery for the time 'a' as one delivery.

In step S6, a ratio Ra (achievement ratio) of an actual total time Ta (or the number of delivery Ca) to a target total time TTa (or the target number of delivery CCa) set in advance is computed based on a measurement result in step S5.

Ratio Ra=Actual total time Ta/Target total time TTa (Ratio Ra=Actual number of delivery Ca/Target number of delivery CCa)

The above-mentioned target total time TTa is a time at which the discharge of air is estimated to have substantially completed when the total time Ta of the air discharge control for the time 'a' has reached this target total time TTa.

Similarly, the target number of delivery CCa is the number according to which the discharge of air is estimated to have substantially completed when the number of times of hydraulic pressure delivery Ca for the time 'a' has reached this target number of delivery CCa.

In step S7, it is judged whether or not the ratio Ra is equal to or greater than a predetermined value (1) (for example, 100%), and if the ratio Ra is smaller than the predetermined value (1), it is estimated that the discharge of air has not yet completed, and the present control routine is terminated.

On the other hand, if the ratio Ra becomes equal to or greater than the predetermined value (1) (for example, 100%), control proceeds to step S16 where it is judged that the air discharge has completed. Accordingly, from next time, it will be judged in step S1 that the control conditions are not fulfilled, and so the air discharge control will not be performed.

When the throttle is opened while the air discharge control is being performed based on the predetermined time 'a' and the throttle opening TVO becomes a predetermined opening TVOS or above, control proceeds to step S8.

In step S8, the air discharge control is suspended (refer to FIG. 6).

When control proceeds to step S8, there is no room to deliver the hydraulic pressure for air discharge, since the throttle opening correlated with the input shaft torque of the automatic transmission is large and the engagement pressure required for the friction engagement elements to be engaged at that gear position is high, but the discharge amount of oil pump 21 is small since the engine rotation speed Ne is low.

Therefore, the air discharge control is suspended to maintain the engagement pressure of the friction engagement elements to be engaged, and thus slippage of the friction engagement elements to be engaged is avoided.

In step S9, the suspension time in step S8 is measured.

Then, in step S10, a correction value for correcting a threshold value of the total ratio (predetermined value (1)), to be described later, in accordance with the suspension time is set.

The larger the correction value is set, the longer the suspension time is.

On the other hand, if the engine rotation speed Ne becomes a predetermined speed NeS or above, control proceeds from step S2 to step S11.

In step S11, similarly as in step S4, shift solenoid (A) 5 and shift solenoid (B) 6 are switched OFF periodically, to perform the air discharge control for periodically delivering the hydraulic pressure to the high clutch H/C.

However, herein, the minute time for periodically switching shift solenoids (A) 5 and (B) 6 OFF is set to the time 'b' longer than the time 'a' in step S4, to deliver the hydraulic pressure to the high clutch H/C for a longer time per one cycle.

This is because, since the engine rotation speed Ne is high and the discharge amount of oil pump 21 large, even the delivery amount of hydraulic pressure for the air discharge control is increased, the hydraulic pressure can still be sufficiently delivered to the friction engagement elements to be engaged.

Further, the cycle for turning shift solenoid (A) 5 and shift solenoid (B) 6 OFF periodically is constant.

In step S12, a total time Tb of the air discharge control (or the number of times of hydraulic pressure delivery Cb) in step S11 is measured.

In step S13, a ratio Rb (achievement ratio) of an actual total time Tb (or the number of delivery Cb) to a target total time TTb (or the target number of delivery CCb) set in advance is computed based on a measurement result of step S12.

Ratio Rb=Actual total time Tb/Target total time TTb (Ratio Rb=Actual number of delivery Cb/Target number of delivery CCb)

The above-mentioned target total time TTb is a time at which the discharge of air is estimated to have substantially completed when the total time Tb of the air discharge control for the time 'b' has reached this target total time TTb, wherein TTb<TTa.

Similarly, the target number of delivery CCb is the number according to which the discharge of air is estimated to have substantially completed when the number of times of hydraulic pressure delivery Cb for the time 'b' has reached this target number of delivery CCb, wherein CCb<CCa.

In step S14, a total value R (R=Ra+Rb) of the ratio Ra of the time when the hydraulic pressure delivery is performed for the time 'a' and the ratio Rb computed in step S13 is computed.

Further, in step S15, it is judged whether or not the total value R is equal to or greater than a value of the predetermined value (1)+correction value (R≧predetermined value (1)+correction value).

The correction value is a value set based on the suspension time in step S10, and a target of total value R is increased corresponding to the mixture of new air due to the suspension.

Accordingly, even if the duty ratio in the periodic hydraulic pressure delivery (the time 'a', 'b' per one cycle) is switched, the completion of the air discharge control can be judged with high accuracy, and even if the new air is mixed due to the suspension, the air discharge control can be performed in just proportion.

According to the above-mentioned embodiment, the duty ratio (time per one cycle) in the periodic hydraulic pressure delivery has been switched to two kinds of values based on the engine rotation speed Ne and throttle opening TVO, but may be switched to three or more kinds of values.

The entire contents of Japanese Patent Application No. 2001-365484, filed Nov. 30, 2001, a priority of which is claimed, are incorporated herein by reference.

While only selected embodiment has been chosen to illustrate the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and not for the purpose of limiting the invention as defined by the appended claims and their equivalents.

What is claimed are:

1. A hydraulic control apparatus of an automatic transmission provided with a plurality of friction engagement elements for gear change, which are engaged when a hydraulic pressure is delivered thereto and released when the hydraulic pressure is drained therefrom, said hydraulic control apparatus comprising:

an operating condition detector detecting operating conditions of said automatic transmission; and a control unit receiving signals from said operating condition detector and controlling delivery and drain of the hydraulic pressure for each of said plurality of friction engagement elements for gear change, respectively;

wherein said control unit:

periodically delivers the hydraulic pressure to the friction engagement elements in released states out of said plurality of friction engagement elements for gear change, to discharge air mixed into a hydraulic circuit;

switches a duty ratio in said periodic hydraulic pressure delivery to a plurality of different values according to said operating conditions; and computes an achievement ratio of air discharge per each of said plurality of duty ratios, and when a sum of said achievement ratios reaches a predetermined value or above, terminates the periodic delivery of hydraulic pressure for air discharge.

2. A hydraulic control apparatus of an automatic transmission according to claim 1, wherein said control unit sets a target total time for completing the air discharge per each of said plurality of duty ratios, and computes a ratio of an actual total time to said target total time as said achievement ratio.

3. A hydraulic control apparatus of an automatic transmission according to claim 1, wherein said control unit sets the target number of times the air discharge is completed per each of said plurality of duty ratios, to compute a ratio of the number of times the hydraulic pressure is actually delivered to said target number of delivery times as said achievement ratio.

4. A hydraulic control apparatus of an automatic transmission according to claim 1, wherein said control unit switches said duty ratio to the plurality of different values according to a discharge amount of an oil pump.

5. A hydraulic control apparatus of an automatic transmission according to claim 1, wherein said control unit suspends the hydraulic pressure delivery for air discharge when a predetermined operating condition is fulfilled, and when the hydraulic pressure delivery is suspended, changes said predetermined value to be compared with said achievement ratio to a greater value.

6. A hydraulic control apparatus of an automatic transmission according to claim 5, wherein said control unit changes said predetermined value to the greater value as a suspension time of hydraulic pressure delivery for air discharge becomes longer.

7. A hydraulic control apparatus of an automatic transmission according to claim 5, wherein said control unit suspends the hydraulic pressure delivery for air discharge when an input torque to said automatic transmission is equal to or greater than a second predetermined value and a discharge amount of an oil pump is less than a predetermined amount.

8. A hydraulic control apparatus of an automatic transmission according to claim 4, wherein said oil pump is driven by an internal combustion engine in combination with said automatic transmission, and wherein said control unit switches said duty ratio in accordance with an engine rotation speed correlated with the discharge amount of the oil pump.

9. A hydraulic control apparatus of an automatic transmission according to claim 7, wherein said oil pump is driven by an internal combustion engine in combination with said automatic transmission, and wherein said control unit judges that the input torque to said automatic transmission is equal to or greater than the second predetermined value when a throttle opening of said engine is equal to or greater than a predetermined opening, and also judges that the discharge amount of said oil pump is less than the predetermined amount when the rotation speed of said engine is less than a predetermined speed.

10. A hydraulic control apparatus of an automatic transmission provided with a plurality of friction engagement elements for gear change, which are engaged when a hydraulic pressure is delivered thereto and released when the hydraulic pressure is drained therefrom, said hydraulic control apparatus comprising:
    air discharge means for periodically delivering the hydraulic pressure to the friction engagement elements in released states out of said plurality of friction engagement elements for gear change, to discharge air mixed into a hydraulic circuit;
    detecting means for detecting operating conditions of said automatic transmission;
    switching means for switching a duty ratio in said periodic hydraulic pressure delivery to a plurality of different values according to said operating conditions;
    computing means for computing an achievement ratio of air discharge per each of said plurality of duty ratios; and
    termination judging means for terminating the periodic delivery of hydraulic pressure for air discharge when a sum of said achievement ratios reaches a predetermined value or above.

11. A hydraulic control method of an automatic transmission provided with a plurality of friction engagement elements for gear change, which are engaged when a hydraulic pressure is delivered thereto and released when the hydraulic pressure is drained therefrom, said hydraulic control method comprising the steps of:
    detecting operating conditions of said automatic transmission;
    switching a duty ratio in periodic hydraulic pressure delivery for air discharge to a plurality of different values according to said operating conditions;
    periodically delivering the hydraulic pressure to the friction engagement elements in released states out of said plurality of friction engagement elements for gear change;
    computing an achievement ratio of air discharge per each of said plurality of duty ratios; and
    terminating said periodic delivery of hydraulic pressure for air discharge when a sum of said achievement ratios reaches a predetermined value or above.

12. A hydraulic control method of an automatic transmission according to claim 11, wherein said step of computing the achievement ratio comprises the steps of:
    setting a target total time for completing the air discharge per each of said plurality of duty ratios; and
    computes a ratio of an actual total time to said target total time as said achievement ratio.

13. A hydraulic control method of an automatic transmission according to claim 11, wherein said step of computing the achievement ratio comprises the steps of:
    setting a target number of times the air discharge is completed per each of said plurality of duty ratios; and
    computing a ratio of a number of times the hydraulic pressure is actually delivered to said target number of delivery times as said achievement ratio.

14. A hydraulic control method of an automatic transmission according to claim 11, wherein said step of switching the duty ratio comprises the steps of:
    detecting a discharge amount of an oil pump; and
    switching said duty ratio to the plurality of different values according to said discharge amount.

15. A hydraulic control method of an automatic transmission according to claim 11, further comprising the steps of:
    suspending the periodic hydraulic pressure delivery for air discharge when a predetermined operating condition is fulfilled; and
    changing said predetermined value to be compared with said achievement ratio to a greater value when the hydraulic pressure delivery is suspended.

16. A hydraulic control method of an automatic transmission according to claim 15, wherein said step of changing the predetermined value comprises the steps of:
    measuring a time during which the hydraulic pressure delivery for air discharge has been suspended; and
    changing said predetermined value to the greater value as said measured time is longer.

17. A hydraulic control method of an automatic transmission according to claim 15, wherein said step of suspending the hydraulic pressure delivery comprises the steps of:
    detecting an input torque to said automatic transmission;
    detecting a discharge amount of an oil pump; and
    suspending the hydraulic pressure delivery for air discharge when said input torque is equal to or greater than a second predetermined value and said discharge amount of the oil pump is less than a predetermined amount.

18. A hydraulic control method of an automatic transmission according to claim 14, wherein said oil pump is driven by an internal combustion engine in combination with said automatic transmission, and wherein said step of detecting the discharge amount of the oil pump detects an engine rotation speed as a parameter correlated with the discharge amount of the oil pump.

19. A hydraulic control method of an automatic transmission according to claim 17, wherein said oil pump is driven by an internal combustion engine in combination with said automatic transmission, wherein said step of detecting the input torque detects a throttle opening of said engine as a parameter correlated with said input torque, and wherein said step of detecting the discharge amount of the oil pump detects an engine rotation speed as a parameter correlated with the discharge amount of the oil pump.

20. A hydraulic control apparatus of an automatic transmission provided with a plurality of friction engagement elements for gear change, which are configured to be engaged when a hydraulic pressure is delivered thereto and released when the hydraulic pressure is drained therefrom, said hydraulic control apparatus comprising:

an air discharge device configured to periodically deliver the hydraulic pressure to the friction engagement elements in released states out of said plurality of friction engagement elements for gear change, to discharge air mixed into a hydraulic circuit;

a detecting device configured to detect operating conditions of said automatic transmission;

a switching device configured to switch a duty ratio in said periodic hydraulic pressure delivery to a plurality of different values according to said operating conditions;

a computing device configured to compute an achievement ratio of air discharge per each of said plurality of duty ratios; and a termination judging device configured to terminate the periodic delivery of hydraulic pressure for air discharge when a sum of said achievement ratios reaches a predetermined value or above.

* * * * *